United States Patent [19]
Rosen et al.

[11] Patent Number: 6,045,027
[45] Date of Patent: Apr. 4, 2000

[54] FRICTION STIR WELDING INTERLOCKING JOINT DESIGN AND METHOD

[75] Inventors: Charles D. Rosen, Huntington Beach; Edward Litwinski, Mission Viejo; Juan M. Valdez, Southgate, all of Calif.

[73] Assignee: The Boeing Company, Seal Beach, Calif.

[21] Appl. No.: 09/034,888

[22] Filed: Mar. 4, 1998

[51] Int. Cl.[7] .......................... B23K 20/12; B23K 31/02; B23K 37/00
[52] U.S. Cl. .......................... 228/112.1; 228/2.1
[58] Field of Search .................... 228/2.1, 112.1

[56] References Cited

U.S. PATENT DOCUMENTS

| | | |
|---|---|---|
| 4,144,110 | 3/1979 | Luc . |
| 4,959,241 | 9/1990 | Thomas et al. . |
| 5,170,031 | 12/1992 | Russell et al. . |
| 5,262,123 | 11/1993 | Thomas et al. . |
| 5,460,317 | 10/1995 | Thomas et al. . |
| 5,469,617 | 11/1995 | Thomas et al. . |
| 5,611,479 | 3/1997 | Rosen .................................. 228/112.1 |
| 5,624,067 | 4/1997 | Harwig et al. . |
| 5,697,511 | 12/1997 | Bampton .............................. 220/4.12 |
| 5,697,544 | 12/1997 | Wykes ...................................... 228/2.1 |
| 5,713,507 | 2/1998 | Holt et al. ............................ 228/112.1 |
| 5,718,366 | 2/1998 | Colligan ............................... 228/112.1 |
| 5,758,999 | 6/1998 | Geise ..................................... 409/231 |
| 5,769,306 | 6/1998 | Colligan ............................... 228/112.1 |
| 5,794,835 | 8/1998 | Colligan et al. ........................ 228/2.1 |
| 5,813,592 | 9/1998 | Midling et al. ...................... 228/112.1 |
| 5,829,644 | 11/1998 | Spinella et al. ...................... 228/112.1 |
| 5,862,975 | 1/1999 | Childress ................................. 228/120 |
| 5,893,507 | 4/1999 | Ding et al. ............................... 228/2.1 |
| 5,975,406 | 11/1999 | Mahoney et al. .................... 228/112.1 |

FOREIGN PATENT DOCUMENTS

WO 93/10935 6/1993 WIPO .
WO 95/26254 10/1995 WIPO .

OTHER PUBLICATIONS

Thomas, W.M., et al., "Emergent Friction Joining Technologies for the Non–ferrous Casting Industry," TWI, BCIRA International Conference, 1996, pp. 30–1 through 30–12.

*Primary Examiner*—Patrick Ryan
*Assistant Examiner*—Kiley Stoner
*Attorney, Agent, or Firm*—Harry B. Field

[57] ABSTRACT

The present invention provides novel joint designs and methods for holding together and drawing together interface edges of workpieces during friction stir welding. The method includes providing an interface edge (30A) on a first workpiece (20A), and an interface edge (30B) on a second workpiece (20B) that is complementary with the interface edge of the first workpiece. The interface edges cooperate with consumable pins (38) to hold the first and second workpieces together. In a preferred embodiment, the interface edges cooperate to draw the first and second workpieces together when a load in a direction normal to the interfaces is applied along the mated interfaces.

23 Claims, 3 Drawing Sheets

FRICTION STIR WELDING INTERLOCKING JOINT DESIGN AND METHOD

FIELD OF THE INVENTION

This invention relates to friction stir welding, and more particularly to a joint weld design and a method for holding together and in some instances drawing together interface edges of workpieces to be welded.

BACKGROUND OF THE INVENTION

Friction stir welding (FSW) is a relatively new welding process for joining together parts of materials such as metals, plastics, and other materials that will soften and commingle under applied frictional heat to become integrally connected. A detailed description of an FSW apparatus and process may be found in Patent Publications WO 93/10935 and WO 95/26254; and U.S. Pat. No. 5,460,317, all of which are hereby fully incorporated by reference. One useful apparatus for FSW is shown in FIGS. 1A and 1B and includes a shoulder 14' at its distal end, and a nonconsumable welding pin 16' extending downward centrally from the shoulder. As shown, two parts to be welded together, exemplified by plates 10A', and 10B' on backing plate 12' are aligned so that edges of the plates along the weld joint are in direct contact. As the rotating tool W' is brought into contact with the weld interface between plates 10A' and 10B', the rotating pin 16' is forced into contact with the material of both plates, as shown. The rotation of the pin in the material and rubbing of the shoulder against the upper surface of the material produce a large amount of frictional heating of both the welding tool and the plate interface. This heat softens the material of the plates in the vicinity of the rotating pin and shoulder, causing commingling of material which, upon hardening, forms a weld. The tool is moved longitudinally along the interface between plates 10A' and 10B', thereby forming an elongate weld all along the interface between the plates. When the weld is completed, the welding tool is retracted.

Still referring to FIGS. 1A and 1B, as the FSW pin 16' plunges into the interface between plates 10A' and 10B', the downward pressure of the pin 16' tends to force plates 10A' and 10B' apart. Separation of the plates during welding may cause anomalies in the weld, such as a surface trough void or a subsurface "wormhole" type of void. Currently, this separation is mitigated by bolting a strap over each plate at the start point of the weld. For this purpose, a special run-on tab must be provided on each plate at the start point of the weld to receive the strap. The strap holds the run-on tab and the backing plate together, and serves to oppose separation of the plates caused by forcing the tool between the plates. Accordingly, this method requires tooling to secure the plates together, in addition to extra straps and run-on tabs. Furthermore, this procedure is time consuming as it involves drilling of the backing plate 12' and bolting the strap in place. The drilling is also damaging to the backing plate 12'. A need exists to provide a new joint weld design and method for eliminating the plate joint separation that does not require additional materials or tooling, is not time consuming, and does not damage the backing plate. In particular, a need exists to provide a joint weld design and method for eliminating plate separation that does not require run-on tabs, since some workpieces cannot have run-on tabs.

SUMMARY OF THE INVENTION

The present invention provides novel joint weld designs and methods for preventing the separation of workpieces to be welded together by friction stir welding (FSW) and for drawing together the interface edges of workpieces during FSW.

The design consists of an interface edge of a first workpiece and an interface edge of a second workpiece to be mated with the interface edge of the first workpiece. In one embodiment of the design, the interface edge of the first workpiece is provided with a generally N-shaped profile. The interface edge of the second workpiece is provided in a shape that is complementary with the N-shaped interface edge of the first workpiece. As these interface edges are mated, and a vertical welding load is applied to the mated interfaces, the workpieces are drawn together. Optionally, consumable pins made of the same material as, or a material compatible with, the workpieces may be inserted through the first and second workpieces along the mated interfaces to provide quick assembly of the workpieces to be welded.

In another embodiment of the design, opposing interface edges, generally of a square shape, are provided, for situations in which two workpieces cannot be slipped onto each other. These situations include forming of continuous welds such as a domed or a cylindrical weld. In this embodiment, the interface edges are complementary with each other, but not necessarily interlocking with each other. Accordingly, consumable pins are inserted through the first and second workpieces along the mated interfaces and serve to hold the workpieces together. Unlike the first embodiment, the first and second workpieces are not drawn together when a vertical load is applied to the mated interfaces.

A method for friction stir welding workpieces with interlocking edges is also provided. An embodiment of the method involves providing generally N-shaped interface edges that are complementary with each other on first and second workpieces, mating the edges, applying a force normal to the mated interfaces, and forming a friction stir weld along the mated interfaces.

Another embodiment of the method involves providing generally square-shaped interface edges that are complementary with each other on first and second workpieces. The method further includes mating the edges, inserting consumable pins through the mated interfaces, and forming a friction stir weld along the mated interfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides novel friction stir weld joint designs and methods for holding together and drawing together interface edges of workpieces during friction stir welding (FSW).

Figure 1A:
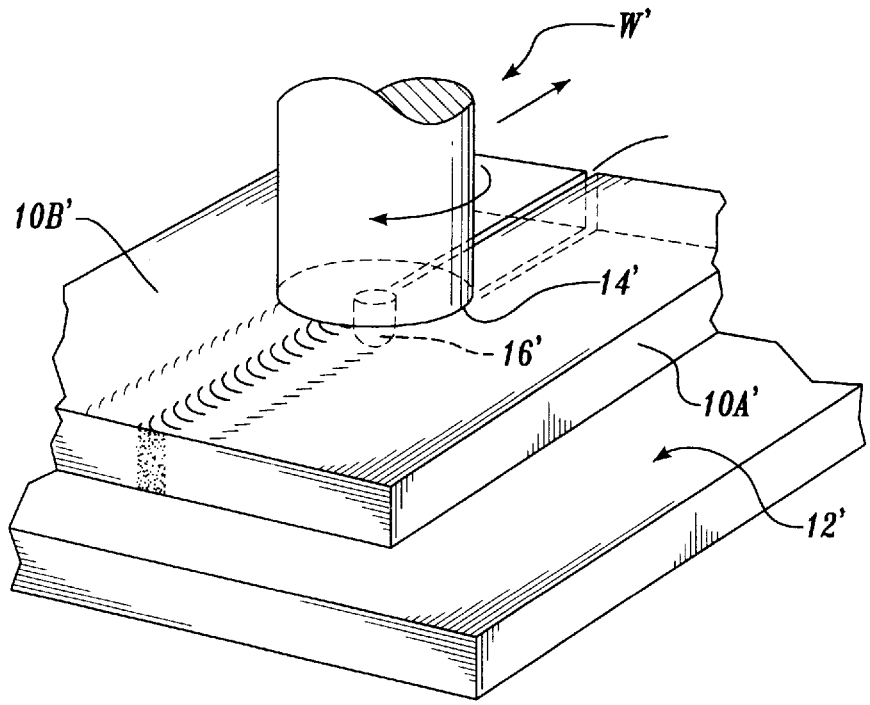
FIG. 1A is a schematic diagram of a prior art friction stir welding apparatus.
Figure 1B:
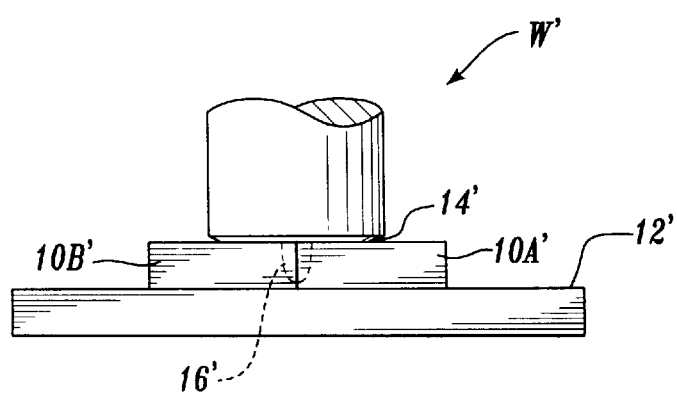
FIG. 1B is a schematic end view showing a prior art friction stir welding apparatus.
Figure 2A:
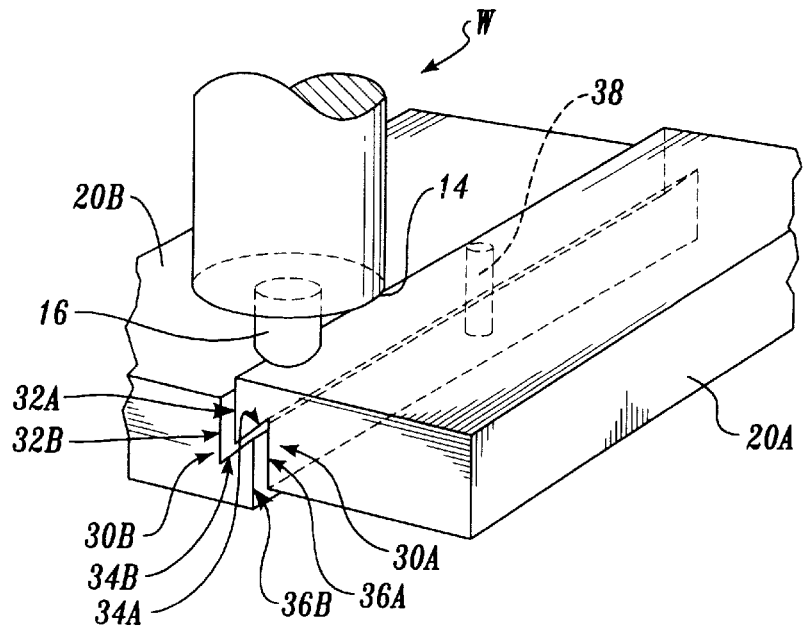
FIG. 2A is a schematic perspective view illustrating a joint weld design and a method for eliminating separation of workpieces according to the first embodiment of the invention.

FIG. 2A illustrates a first embodiment of a joint weld design of the present invention and the use of such joint design in a method of friction stir welding workpieces together without separation of workpieces. A conventional FSW tool W has a shoulder 14 at its distal end, and a nonconsumable welding pin 16 extending downward centrally from the shoulder. A first workpiece 20A and a second workpiece 20B are to be friction stir welded. The first workpiece 20A is provided with an interface edge 30A and the second workpiece 20B is provided with an interface edge 30B along which the weld is to be formed. The interface edge 30A on the first workpiece 20A has a generally N-shaped profile, while the interface edge 30B on the second workpiece 20B is provided in a shape that is complementary with the N-shaped interface edge 30A of the first workpiece 20A.

In FIG. 2A, specifically, the interface edge 30A includes a first vertical edge portion 32A extending from an upper surface of the first workpiece 20A downward about halfway through a thickness of the first workpiece, a slanted edge portion 34A extending from the end of the first vertical edge portion 32A upward toward the upper surface of the first workpiece, and a second vertical edge portion 36A extending from the end of the slanted edge portion 34A downward toward a bottom surface of the first workpiece. The interface edge 30B of the second workpiece 20B includes a first vertical edge portion 32B, a slanted edge portion 34B, and a second vertical edge portion 36B, which are all complementary with the corresponding portions, 32A, 34A, and 36A, of the interface edge 30A of the first workpiece 20A.

When the complementary interface edges 30A and 30B are mated as illustrated in FIG. 2A, and a normal load is applied to workpieces 20A and 20B along the mated interfaces by the welding pin 16 of the FSW tool W, the workpieces are drawn together. The vertical welding load normal to the interfaces forces the interfaces tightly together throughout the length of the friction stir weld.

Optionally, one or more consumable pins 38, which are made of material the same as or compatible with the workpieces 20A and 20B, may be inserted through the first and second workpieces along the mated interfaces to provide quick assembly of the workpieces prior to welding. For this purpose, the pin need not be configured as shown in FIG. 2A. The pin could be any type of fastener, for example a consumable set screw. Furthermore, the pin need not be inserted throughout the thickness of the workpieces; it may be inserted partially as long as it holds the workpieces together.

It should be understood that profiles other than the specific embodiment described above would provide the advantages of the present invention as they relate to the drawing together of the workpieces as a normal load is applied to the mated interfaces. For example, there could be multiple notches provided in an interface surface.

Figure 2B:
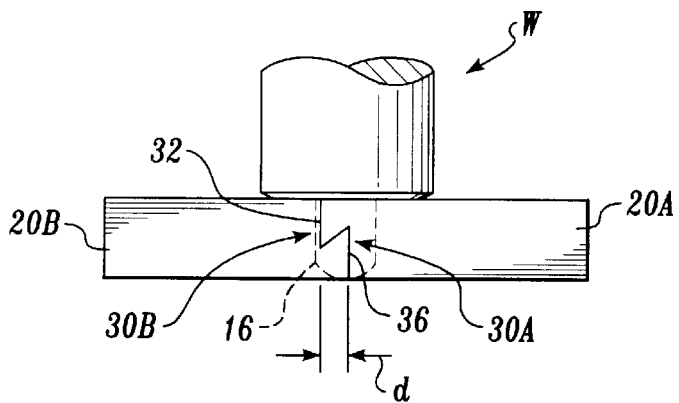
FIG. 2B is a schematic end view of FIG. 2A.

FIG. 2B illustrates a schematic end view of the embodiment illustrated in FIG. 2A. A surface root 32 is formed along the interface where the first vertical edge portions 32A and 32B of the interface edges 30A and 30B of the workpieces meet. A bottom root 36 is formed along the interface where the second vertical edge portions 36A and 36B of the interface edges 30A and 30B of the workpieces meet. Preferably, the bottom root 36 of the interface edges 30A and 30B of the workpieces is aligned with the central axis of the welding pin 16 so that the resulting weld encompasses the entire mated interface. In this regard, when the bottom root 36 and the central axis of the welding pin 16 are aligned, the total interface width, defined as the distance between the surface root 32 and the bottom root 36, represented by "d", preferably should not exceed the radius of the welding pin 16.

Figure 2C:
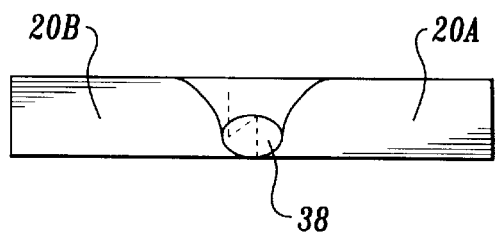
FIG. 2C is a cross-sectional view of welded workpieces according to the first embodiment of the invention.

FIG. 2C illustrates a cross-sectional view of the first and second workpieces 20A and 20B welded together according to the embodiment of the present invention illustrated in FIGS. 2A and 2B. As shown, a weld nugget 38 consumes both interface edges of the first and second workpieces and the optional consumable pins during FSW.

Figure 3A:
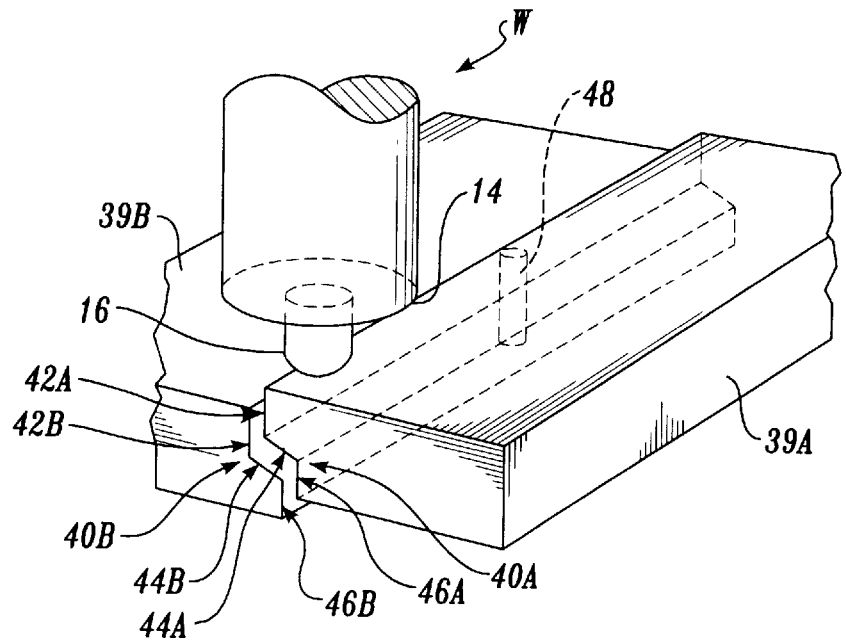
FIG. 3A is a schematic perspective view illustrating a joint weld design and a method for eliminating separation of workpieces according to the second embodiment of the invention.
Figure 3B:
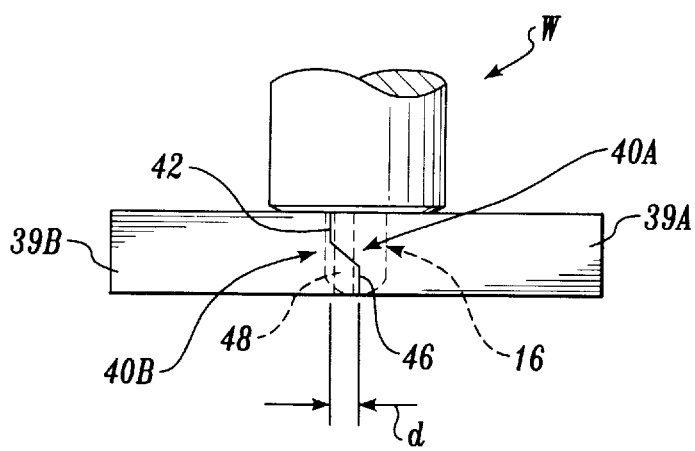
FIG. 3B is a schematic end view of FIG. 3A.
Figure 3C:
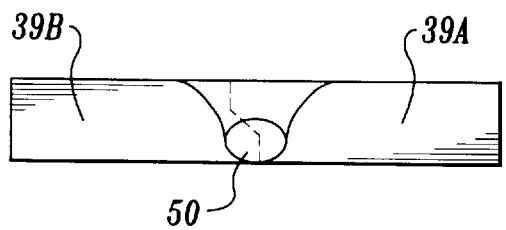
FIG. 3C is a cross-sectional view of welded workpieces according to the second embodiment of the invention.

FIGS. 3A, 3B, and 3C illustrate a second embodiment of a joint weld design and the use of such joint design in a method of friction stir welding workpieces in accordance with the present invention. The second embodiment may be preferable for situations in which two workpieces cannot be slipped onto each other; however, unlike the embodiment of FIGS. 2A, 2B, and 2C, this embodiment does not draw together the workpieces when a normal load is applied. Situations in which this embodiment is particularly useful include forming of continuous welds such as a domed or a cylindrical circumferential weld.

Referring to FIG. 3A, an FSW tool W has a shoulder 14 at its distal end, and a nonconsumable welding pin 16 extending downward centrally from the shoulder. A first workpiece 39A and a second workpiece 39B are to be friction stir welded. The first workpiece 39A is provided with an interface edge 40A and the second workpiece 39B is provided with an interface edge 40B along which the weld is to be formed. The interface edge 40A on the first workpiece 39A has a generally square shape, while the interface edge 40B on the second workpiece 39B is provided in a shape that is complementary with the square-shaped interface edge 40A on the first workpiece 39A.

Specifically, in the illustrated embodiment the interface edge 40A includes a first vertical edge portion 42A extending from an upper surface of the first workpiece 39A downward about halfway through a thickness of the first workpiece, a slanted edge portion 44A extending from the end of the first vertical edge portion 42A downward toward a bottom surface of the first workpiece, and a second vertical edge portion 46A extending from the end of the slanted edge portion 44A downward toward the bottom surface of the first workpiece. The interface edge 40B of the second workpiece 39B includes a first vertical edge portion 42B, a slanted edge portion 44B, and a second vertical edge portion 46B, which all are complementary with the corresponding portions, 42A, 44A, and 46A, of the interface edge 40A of the first workpiece 39A. The slanted edge portions 44A and 44B may, in the alternative, extend horizontally in parallel with the upper or bottom surfaces of the workpieces.

When the complementary interface edges 40A and 40B are mated together, one or more consumable pins 48, which are made of material the same as or compatible with the workpieces 39A and 39B, are inserted through the first and second workpieces along the mated interfaces to secure the workpieces together. For this purpose, the pin need not be configured as shown in FIG. 3A, and may be any type of fastener, for example a consumable set screw. Also, the pin need not be inserted throughout the thickness of the workpieces, and may be inserted partially as long as it secures the workpieces together.

It should be understood that other profiles along the interface would provide the advantages of the present invention as they relate to the slipping onto each other of the interface edges. For example, there could be multiple square notches provided in an interface. In a further alternative, the interface edges 40A and 40B may be formed in a single slanted line extending diagonally from the upper surface to the bottom surface of the first and second workpieces 39A and 39B, respectively.

FIG. 3B shows a schematic end view of the second embodiment of the present invention as illustrated in FIG. 3A. A surface root 42 is formed along the interface where the first vertical edge portions 42A and 42B of the interface edges 40A and 40B of the workpieces meet. A bottom root 46 is formed along the interface where the second vertical edge portions 46A and 46B of the interface edges 40A and 40B of the workpieces meet. As before, the bottom root 46 of the interface edges 40A and 40B of the workpieces is preferably aligned with the central axis of the welding pin 16 so that the resulting weld encompasses the entire mated interface. Also as before, when the bottom root 46 and the central axis of the welding pin 16 are thus aligned, the total interface width, defined as the distance between the surface root 42 and the bottom root 46, represented by "d", preferably should not exceed the radius of the welding pin 16.

FIG. 3C illustrates a cross-sectional view of the first and second workpieces 39A and 39B welded together according to the embodiment of the present invention illustrated in FIGS. 3A and 3B. As shown, a weld nugget 50 consumes both interface edges of the first and second workpieces and the consumable pins during FSW.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A friction stir welding joint comprising:
    a first workpiece having an interface edge including at least one slanted edge; and
    a second workpiece having an interface edge mated with the interface edge of the first workpiece;
    wherein a load normal to the mated interfaces causes the first workpiece and the second workpiece to be drawn together.

2. The joint of claim 1, wherein one or more consumable pins are inserted through the first and second workpieces along the mated interfaces.

3. The joint of claim 1, wherein the interface edge of the first workpiece comprises three edge portions.

4. The joint of claim 3, wherein the interface edge of the first workpiece comprises a first vertical edge portion extending from an upper surface of the workpiece downward about half way through a thickness of the workpiece, a slanted edge portion extending from the end of the first vertical edge portion upward toward the upper surface of the workpiece, and a second vertical edge portion extending from the end of the slanted edge portion downward toward a bottom surface of the workpiece.

5. The joint of claim 1, wherein the interface edge of the first workpiece comprises an N-shaped profile.

6. A friction stir welding joint comprising:
    a first workpiece having an interface edge;
    a second workpiece having an interface edge mated with the interface edge of the first workpiece; and
    one or more consumable pins inserted through the first and second workpieces along the mated interfaces.

7. The joint of claim 6, wherein the interface edge of the first workpiece comprises three edge portions.

8. The joint of claim 7, wherein the interface edge of the first workpiece comprises a first vertical edge portion extending from an upper surface of the workpiece downward about half way through a thickness of the workpiece, a slanted edge portion extending from the end of the first vertical edge portion either parallel with the upper surface or downward toward a bottom surface of the workpiece, and a second vertical edge portion extending from the end of the slanted edge portion downward toward the bottom surface of the workpiece.

9. The joint of claim 6, wherein the interface edge of the first workpiece comprises a square-shaped profile.

10. A method of friction stir welding workpieces, the method comprising:
    (a) providing an interface edge on a first workpiece, the interface edge including at least one slanted edge;
    (b) providing an interface edge on a second workpiece that is complementary with the interface edge of the first workpiece;
    (c) mating the interface edge of the first workpiece with the interface edge of the second workpiece;
    (d) drawing the first workpiece and second workpiece together by applying a force normal to the mated interfaces; and
    (e) forming a friction stir weld along the mated interfaces.

11. The method of claim 10, wherein one or more consumable pins are inserted through the first and second workpieces along the mated interfaces.

12. The method of claim 10, wherein the interface edge of the first workpiece comprises three edge portions.

13. The method of claim 12, wherein the interface edge of the first workpiece comprises a first vertical edge portion extending from an upper surface of the workpiece downward about halfway through a thickness of the workpiece, a slanted edge portion extending from the end of the first vertical edge portion upward toward the upper surface of the workpiece, and a second vertical edge portion extending from the end of the slanted edge portion downward toward a bottom surface of the workpiece.

14. The method of claim 10, wherein the interface edge of the first workpiece comprises an N-shaped profile.

15. The method of claim 10, wherein the normal force is applied by pressing a friction stir welding tool pin into the mated interfaces.

16. The method of claim 15, wherein the central axis of the welding tool pin is aligned with a bottom root of the interface edges.

17. The method of claim 16, wherein the total interface width of the first workpiece and the second workpiece does not exceed the radius of the welding tool pin.

18. A method of friction stir welding workpieces, the method comprising:
    (a) providing an interface edge on a first workpiece;
    (b) providing an interface edge on a second workpiece that is complementary with the interface edge of the first workpiece;
    (c) mating the interface edge of the first workpiece with the interface edge of the second workpiece;

(d) inserting one or more consumable pins through the first and second workpieces along the mated interfaces; and (e) forming a friction stir weld along the mated interfaces.

19. The method of claim 18, wherein the interface edge of the first workpiece comprises three edge portions.

20. The method of claim 19, wherein the interface edge of the first workpiece comprises a first vertical edge portion extending from an upper surface of the workpiece downward about halfway through a thickness of the workpiece, a slanted edge portion extending from the end of the first vertical edge portion either parallel with the upper surface or downward toward a bottom surface of the workpiece, and a second vertical edge portion extending from the end of the slanted edge portion downward toward the bottom surface of the workpiece.

21. The method of claim 18, wherein the interface edge of the first workpiece comprises a square-shaped profile.

22. The method of claim 18, wherein the friction stir weld is formed using a friction stir welding tool pin and the central axis of the pin is aligned with a bottom root of the interface edges.

23. The method of claim 22, wherein the total interface width of the first workpiece and the second workpiece does not exceed the radius of the welding tool pin.

* * * * *